United States Patent [19]

Valbona et al.

[11] 4,351,612
[45] Sep. 28, 1982

[54] DRINK MIXER

[75] Inventors: Bruno M. Valbona, Farmington; William C. Pound, Burlington, both of Conn.

[73] Assignee: Dynamics Corporation of America, Greenwich, Conn.

[21] Appl. No.: 279,007

[22] Filed: Jun. 30, 1981

Related U.S. Application Data

[62] Division of Ser. No. 234,898, Feb. 17, 1981.

[51] Int. Cl.³ .............................................. B01F 7/26
[52] U.S. Cl. .................................... 366/206; 366/197
[58] Field of Search ............... 366/197, 200, 201, 206, 366/207

[56] References Cited

U.S. PATENT DOCUMENTS

| | | | |
|---|---|---|---|
| 1,729,996 | 10/1929 | Robinson et al. | 366/206 |
| 1,764,337 | 6/1930 | Neilsen | 200/163 |
| 2,134,261 | 10/1938 | Oswell | 366/197 |
| 2,585,822 | 2/1952 | Myers | 366/206 |
| 2,798,979 | 7/1957 | Ernst | 366/206 X |
| 3,311,353 | 3/1967 | Rogenski | 366/197 |
| 3,379,416 | 4/1968 | Smader et al. | 366/206 |

FOREIGN PATENT DOCUMENTS 487006 11/1953 Italy ..................................... 366/197

Primary Examiner—Philip R. Coe
Attorney, Agent, or Firm—Sixbey, Friedman & Leedom

[57] ABSTRACT

The drink mixer (10) includes a standard (12), base (14) and motor housing (16) formed to provide an integral, unitary wall structure adjacent a stirrer arm (18). The front of the standard and top of the base are protected by a removable splatter shield (22) which is properly positioned by a locator pin (118) formed on the standard (12). The splatter shield (22) is held in place by a cup support assembly (24) and a switch actuator assembly (26). This switch actuator assembly (26) operates a power switch assembly (58) including a flat slide plate (74) which shields a normally closed microswitch (96). The lower edge of the slide plate (74) contacts a switch actuating arm (100) to depress the microswitch button (98) when the slide plate is in an "off" position. The slide plate (74) moves away from the switch actuating arm (100) to release the switch button (98) and actuate the mixer (10).

12 Claims, 5 Drawing Figures

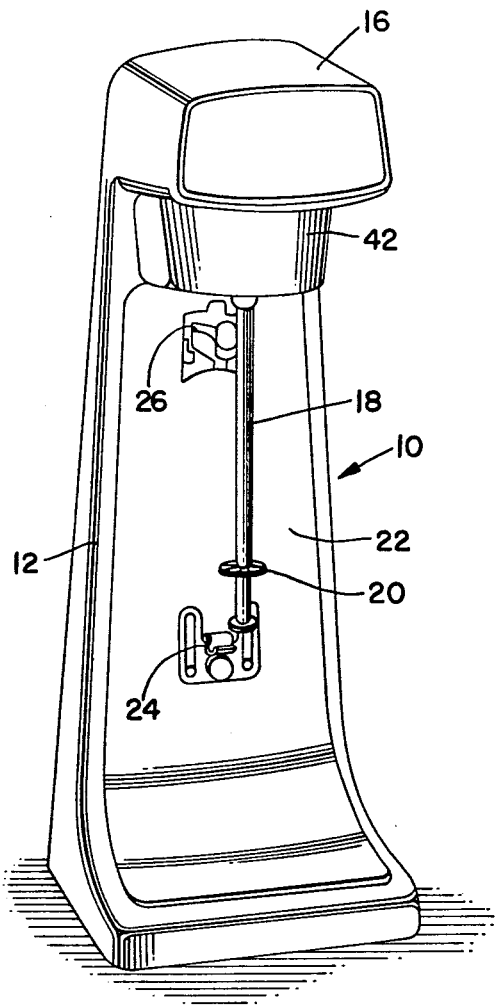
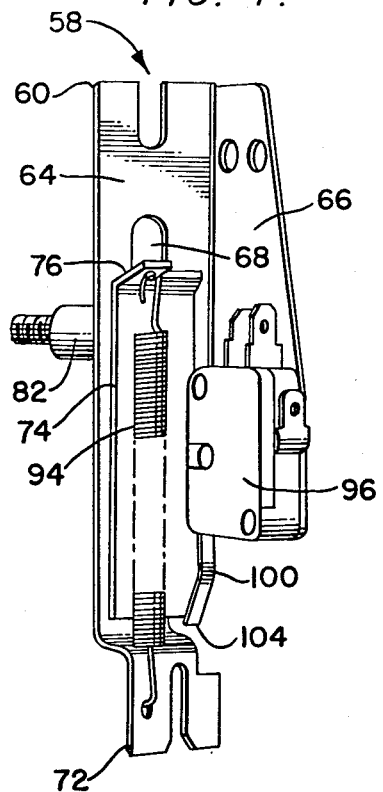
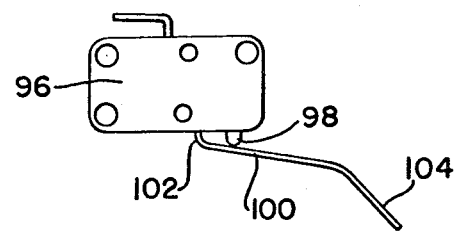
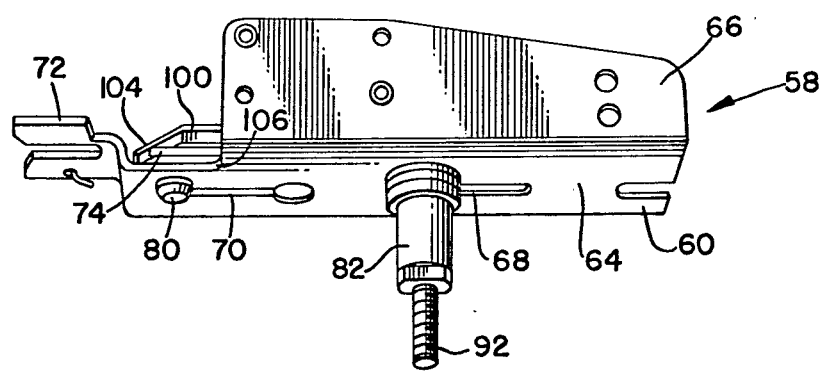

DRINK MIXER

This application is a division of application Ser. No. 234,898, filed Feb. 17, 1981.

FIELD OF THE INVENTION

The present invention relates to electric drink mixers generally, and more particularly to an improved electric drink mixer having a novel standard construction with a removable face panel to facilitate sanitary operation.

BACKGROUND OF THE INVENTION

Electric drink mixers have been used for many years in homes and commercial establishments for mixing a variety of beverages. In recent years, such mixers have become less desirable for commercial use due to stringent sanitation codes. The conventional mixer generally includes a base from which rises a substantially vertical standard, and an electric drive motor projects over the base from the top of the standard. The motor carries a depending stirring arm which extends into a container supported by suitable support hardware attached to the front of the standard. The front face of the standard is also generally provided with openings for projecting switch operators which control the electrical drive circuitry mounted internally within the standard.

During the operation of an electric drink mixer, the stirring arm rotates at high speeds resulting in some splattering of the stirred liquid, particularly if the liquid container is overfilled. Also, once a drink is mixed, mixer operators have the tendency to remove the drink container before rotation of the stirring arm ceases. This causes the stirring arm to throw liquid against the face of the standard.

In the past, the contamination problem experienced by electric drink mixers as a result of liquid splatter has been recognized. For example, splash guards of the type illustrated by U.S. Pat. No. 2,134,261 to B. M. Oswell have been developed to prevent liquid from splashing onto a wall behind a drink mixer. These splash guards are attached behind the mixer standard, and although they operate effectively to protect objects external to the mixer, they do not protect the mixer standard and hardware on the standard face from contamination.

Electric circuitry for electric drink mixers has been placed in a hollow standard in an attempt to protect such circuitry from contamination, and sliding switches have been developed with operators which project through openings in the front face of the mixer standard. Constructions of this type, illustrated by U.S. Pat. Nos. 1,729,966 to P. H. Robinson et al., 1,764,337 to E. Bielsen and 2,585,822 to L. Meyers did provide limited splash protection to the control circuitry, but the face of the standard, the container mounting and switch hardware, and the drive motor were fully exposed to contamination.

Greatly enhanced splatter protection was provided by the drink mixer construction illustrated by U.S. Pat. No. 3,379,416 to C. L. Smader et al. In this construction, the electronic circuitry for the drink mixer is encased in a hollow standard or column and a switch mechanism is mounted upon the rear wall of the column to avoid contamination entering through the openings in the front face of the column. This switch mechanism includes a spring biased, sliding switch plate having a raised switch contacting surface intermediate the ends of the plate which moves in front and in the plane of a button switch operator. The switch is operated by hardware on the face of the column which is readily removable for cleaning. Also, the drive motor for the mixer is partially encased in a housing so that only the motor hub is subjected to liquid splatter.

Even improved drink mixer constructions of the type illustrated by the Smader et al patent have proven difficult to maintain in a contamination free condition sufficient to meet commercial sanitation standards. The projecting motor hub must be formed of stainless steel or highly machined metal to provide a smooth surface which may be cleaned to remove splattered liquid. The large diameter of the hub projecting through a protective housing creates an annular crack around the hub where liquid contamination builds up. Also, liquid splattered from the stirring arm enters the openings and crevices in the front of the standard where the standard sidewalls mate with the standard front wall and creates contamination which is difficult to eliminate. When splattered material reaches the mixer switch mechanism, the resultant accumulation of sticky material can cause sticking of the switch button as well as inhibiting the free movement of the sliding switch operating mechanism.

It is a primary object of the present invention to provide a novel and improved electric drink mixer having a standard formed with unitary front and sidewalls adjacent the rotary stirrer to provide no crevices for splattered material to enter. These unitary surfaces are easily cleaned after the mixer is used.

Another aspect of the present invention is to provide a novel and improved electric drink mixer wherein the mixer motor including the motor hub is completely enclosed within a housing formed at the top of the standard. The portions of the motor housing adjacent the stirrer arm are formed as a unitary unit with the front and sidewalls of the standard to facilitate cleaning and preclude contamination. The bottom wall of the housing is provided with a single, small opening to receive the stirrer shaft, and this opening is easily closed by a collar formed on the shaft. Since the motor hub is completely enclosed, there is no need to form this hub of stainless steel or other expensive materials which can be readily cleaned.

A further aspect of the present invention is to provide an electric drink mixer having a removable splatter shield mounted to cover the front of the standard and the top of the standard base. This splatter shield is formed of stainless steel or other material which may easily be cleaned and is secured to the standard by a removable switch operator and container support. Vibration preventive mounts are provided on the standard to engage the splatter shield and preclude vibration during operation of the mixer.

Another object of the present invention is to provide an electric drink mixer having a switch assembly including a microswitch which opens the power circuit to the mixer motor when the switch button is depressed. A sliding switch operator is provided to positively depress the switch button and open the power circuit each time the mixer is deactivated, and any sticking of the switch button in the closed position will insure that the power circuit remains open. The sliding switch actuator is a flat plate having no raised surfaces which can contact the biasing spring for the plate and thereby inhibit free plate movement.

BRIEF DESCRIPTION OF THE DRAWINGS

FIG. 1 is a perspective view of the drink mixer of the present invention;

FIG. 3 is a perspective view of the switch assembly used in the drink mixer of FIG. 1;

FIG. 4 is a second perspective view of the switch assembly of FIG. 3; and

FIG. 5 is a side view of the microswitch and switch operating arm of the switch assembly of FIG. 3.

DESCRIPTION OF THE PREFERRED EMBODIMENTS

Figure 2:
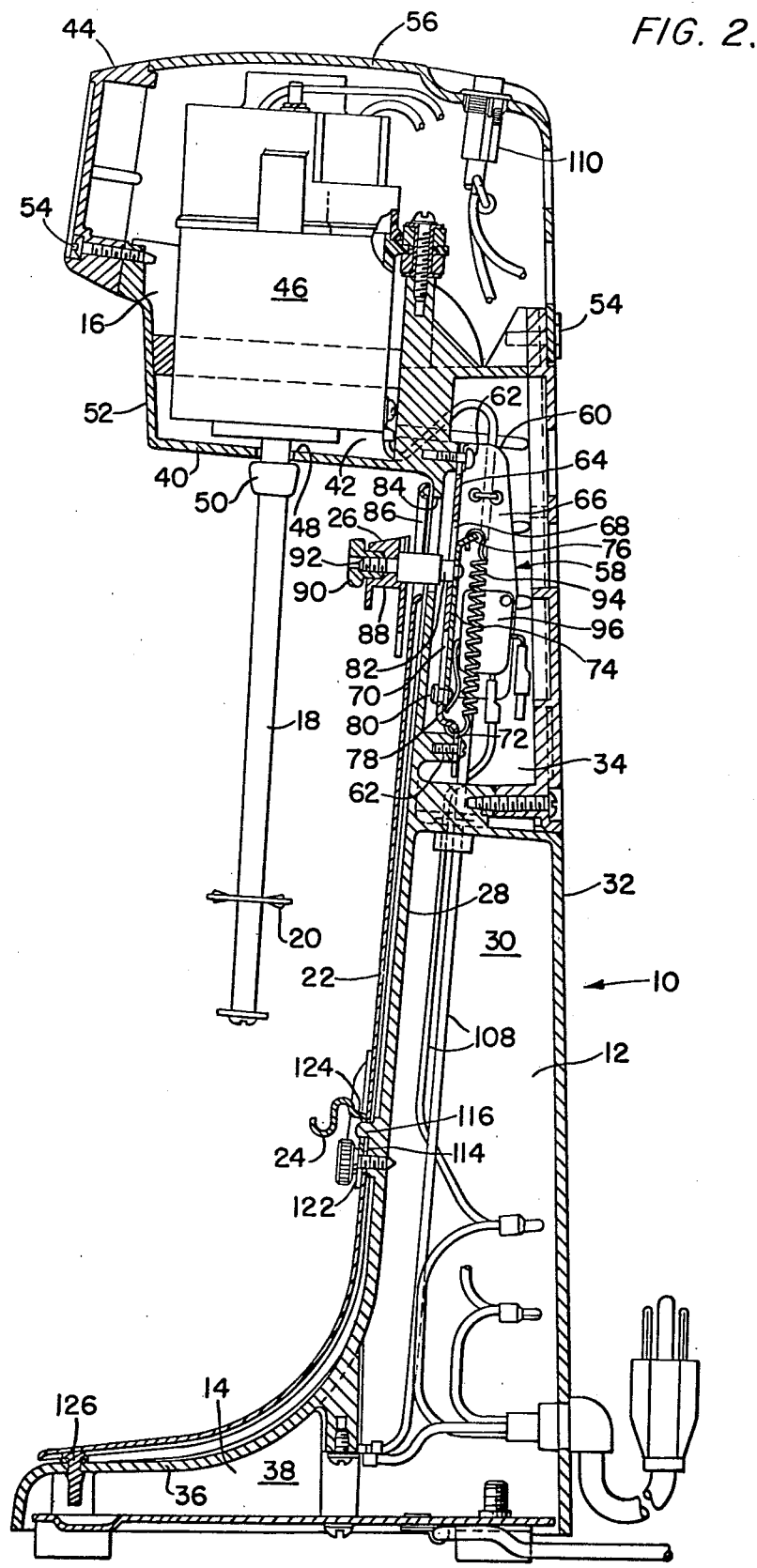
FIG. 2 is a sectional view of the drink mixer of FIG. 1.

The drink mixer 10 of the present invention includes a standard 12 which extends upwardly from a laterally projecting base 14 to a laterally projecting motor housing 16. A stirring arm or shaft 18 depends from the motor housing toward the base in spaced relationship to the standard, and a suitable agitator 20 is mounted on the lower end of the stirring arm.

The front of the standard 12 and the top of the base 14 are protected by a removable, unitary splatter shield 22 of stainless steel or similar material which may be removed from the mixer for cleaning. The splatter shield is secured to the standard 12 by means of a removable container support assembly 24 and a removable switch actuator assembly 26.

The standard 12, base 14 and motor housing 16 are formed by a unitary structure which may constitute a single casting or molding. This structure provides a standard front wall 28, standard sidewalls 30 and a standard backwall 32 which are formed integrally to define an internal chamber 34. At the base, the standard front wall curves outwardly into an integral base topwall 36 while the standard sidewalls extend outwardly into base sidewalls 38 which are integral with the base topwall. Similarly, at the motor housing, the standard front wall angles sharply outward to form a motor housing bottom wall 40 which is integral with housing sidewalls 42 that define a rounded lower housing section. A cover section 44 of plastic or metal mates with the motor housing sidewalls to form the top of the motor housing. The resultant integral base, standard and motor housing provide a unitary unbroken structure with no joints or cracks in the area of the stirring arm to receive splatter contamination.

The motor housing 16 is formed to completely enclose an electric drive motor 46 so that only a small opening 48 is required in the housing bottom wall 40 to receive the stirrer arm 18. This opening is substantially closed to contamination by a collar 50 formed on the stirrer arm, and since the opening is small, it provides a minimal break in the solid motor housing bottom wall.

The motor housing bottom wall 40 curves upwardly to provide an upwardly extending front wall section 52. The cover section 44 mates with this front wall section, the standard rear wall 32 and the motor housing sidewalls 42, and is held in place by bolts 54. This cover section forms the topwall 56 of the motor housing.

Mounted within the chamber 34 of the standard 12 is a slide operated power switch assembly 58 for controlling the energization of the drive motor 46. This power switch assembly includes a mounting bracket 60 which is mounted directly on the front wall 28 of the standard 12 by means of mounting bolts 62. The mounting bracket is substantially L-shaped in cross section and is formed by a front plate 64 integrally joined to a side plate 66 which extends substantially perpendicular thereto. The front plate is provided with upper and lower elongated slots 68 and 70 respectively which are substantially aligned and which extend through the front plate. The lower end of the front plate below the lower slot 70 is provided with an inwardly offset flange 72.

A flat side plate 74 having an upturned leading edge portion 76 is mounted for sliding movement on the front plate 64. This slide plate supports a forwardly projecting mounting pin 78 at the lower end thereof which extends through the lower slot 70 and which is retained in the lower slot by an integral head 80. An upper mounting pin 82 projects from the upper end of the slide plate 74 through the upper slot 68, a slot 84 in the front wall 28 of the standard 12 and a slot 86 in the splatter shield 22. The outer end of the mounting pin 82 receives the switch actuator 26 which is cup operated and which is shaped at 88 to receive the lip of a cup. The switch actuator is held in place by a nut 90 which engages threads 92 on the end of the mounting pin 82.

The pins 78 and 82 are designed to hold the flat slide plate 74 in close engagement with the surface of the front plate 64 throughout the entire extent of the slide plate section which overlies the front plate. This is extremely important, for the flat slide plate is designed to prevent contamination from entering the space between the slide plate and the front plate. Also, each sliding movement of the slide plate relative to the front plate causes a wiping action to occur uniformly on all surfaces of the front plate which pass beneath the slide plate. The extent of slide plate movement in either direction is governed by the extent of the upper and lower slots 68 and 70 which engage the pins 78 and 82 to limit slide plate movement.

The slide plate 74 is biased to the lowermost extent of slide plate travel with the pin 78 against the lower edge of the slot 70 by a biasing spring 94. The upper end of the biasing spring is attached to the upturned leading edge portion 76 of the slide plate, while the lower end of the biasing spring is attached to the inwardly offset flange 72 of the front plate 64. It is important to note that the combination of a completely flat slide plate with the connection of the biasing spring between the upturned edge 76 and the inwardly offset flange 72 insures that the biasing spring will always be spaced from the flat surface of the slide plate 74. Otherwise, contact between the biasing spring and any portion of the slide plate between the ends thereof tends to force the slide plate toward the front plate as the biasing spring expands, thus inhibiting free movement of the slide plate.

A normally closed microswitch 96 is secured to the side plate 66 of the bracket 60. This microswitch includes a switch button 98 which, when fully extended, causes the circuit through the microswitch to close. When the switch button is depressed, the circuit through the microswitch is opened. Microswitches capable of operating in this manner are well known to the art.

The microswitch button 98 is operated by means of an elongated operating arm 100 having one end 102 pivoted to the microswitch 96 and the opposite end 104 inclined to engage the lower edge of the slide plate 74 when the slide plate is in the lowermost position. In this position of the slide plate, the slide plate lower edge forces the operating arm 100 inwardly to depress the microswitch button 98 and positively open the circuit through the microswitch. When the slide plate moves upwardly, the lower edge thereof moves away from contact with the inclined end 104 of the elongated switch operating arm 100 and uncovers a slot 106 in the lower edge of the front plate 64. The inclined end of the switch operating arm now moves into the slot 106 to cause the operating arm to release the button 98, and the circuit through the microswitch 96 closes.

It is important to note that microswitch 96 is not positively activated by the slide plate 74 to close the circuit through the microswitch when the slide plate moves upwardly. Instead, the slide plate moves away from all positive contact with the microswitch, and if the microswitch is operating properly, the circuit therethrough will automatically close as the button 98 is released. However, if the button should stick in the depressed position due to a buildup of contamination thereon or some other malfunction, the circuit through the microswitch will remain open. This provides a significant safety feature.

Also, it is impossible for the microswitch to remain closed when the slide plate moves back to the lowermost position in response to the bias of the spring 94. This return movement of the slide plate does result in positive activation of the microswitch 96 to open the circuit therethrough. The lower edge of the slide plate closes the slot 106 and positively engages the lower inclined end 104 of the elongated switch operating arm 100. The operating arm is forced to pivot inwardly about the end 102 to engage and depress the switch button 98. The switch button is not free to move from this depressed position until the slide plate 74 again moves upwardly away from contact with the end of the operating arm to open the slot 106.

Finally, the switch button 98 is never in the path of movement of the slide plate 74 but is always shielded from contamination by the slide plate in all positions thereof. Both the slide plate and the switch operating arm 100 always cover the button 98 and extend between the button and the front of the standard 12.

Power for the motor 46 is provided from power input leads 108 through the microswitch 96 to the motor. A speed control switch 110 mounted on the top wall 56 of the motor housing may be connected into the power circuit in a known manner to control the speed of the motor 46. The motor power circuit may be connected in any known manner which will permit the microswitch 96 to break or complete the power circuit to the motor.

The splatter shield 22 is provided with the slot 86 to receive the mounting pin 82 and permit the pin to move vertically to operate the power switch assembly 58. The lower portion of the splatter shield is provided with a mounting hole 114 and a locator hole 116. This locator hole receives a locator pin 118 which projects from a mounting pad 120 formed on the standard front wall 28. A similar mounting hole 122 and locator hole 124 are formed in the container support 24 to mate with the corresponding holes 114 and 116. To mount the splatter shield on the front of the standard 12, the shield is positioned on the pad 120 with the locator pin 118 in the locator hole 116. This orients the shield properly so that the slot 112 is in position to receive the mounting pin 82. The shield may now be secured against both the mounting pad and rubber vibration pads 126 mounted on the front wall 28 of the standard 12.

When the shield is oriented on the standard, the container support may be located over the shield with the locator pin 118 in the locator hole 124, and a mounting bolt 128 is then inserted into a threaded hole in the pad 120 through the mounting holes 122 and 114 to hold both the container support and splatter shield in place. Now the actuator assembly 26 can be secured in place by the nut 30.

INDUSTRIAL APPLICABILITY

The drink mixer 10 may be safely operated by placing the rim of a container into the slot 88 in the switch actuator 26 to raise the slide plate 74 and release the switch button 98. When mixing by the stirring arm 18 is completed, the container is removed, and the spring 94 returns the slide plate to positively open the circuit through the microswitch 96.

To easily clean the drink mixer after use, the switch actuator 26 and container support 24 are removed so that the splatter shield 22 can be removed and separately cleaned. The unitary structure forming the standard, base and motor housing may now be wiped to clean and sanitize the mixer.

We claim:

1. A drink mixer comprising an upright standard having a standard frontwall and spaced standard sidewalls extending from opposite sides of said standard frontwall, a base extending outwardly from the lower end of said standard and having a base topwall which curves upwardly into the frontwall of said standard and is formed integrally therewith and base sidewalls extending from opposite sides of said base topwall, said base sidewalls extending from and being formed integrally with the sidewalls of said standard, a motor housing extending outwardly from the upper end of said standard above said base and including a housing bottomwall formed integrally with said standard frontwall, a motor mounted within said motor housing and completely encased therein, a stirring shaft extending from said motor through the housing bottomwall in spaced relation to said standard frontwall, said standard front and sidewalls, base top and sidewalls, and housing bottomwall being formed as a unitary, single structure, and a unitary curved splatter shield removably mounted on said mixer, said splatter shield covering the standard frontwall and base topwall.

2. The drink mixer of claim 1 wherein said standard frontwall is provided with a splatter shield locating pin which projects outwardly from said standard frontwall, said splatter shield having a locator aperture for receiving said locating pin when the splatter shield is properly located on said drink mixer.

3. The drink mixer of claim 1 which includes a support assembly for the bottom of a container, mounting means for removably mounting said support assembly on said standard frontwall, said splatter shield including a mounting aperture to receive said mounting means, the mounting means operating to removably secure both said support assembly and said splatter shield to said standard frontwall.

4. The drink mixer of claim 3 wherein a flat mounting pad is formed on the standard frontwall and projects outwardly therefrom, said flat mounting pad being adapted to engage said splatter shield and to space said splatter shield from the standard frontwall, the splatter shield including a locator hole, and the mounting pad being provided with a locator pin which projects therefrom to engage said locator hole when the splatter shield is properly positioned on said standard.

5. The drink mixer of claim 3 which includes a switch assembly means mounted within said standard for controlling said motor, said switch assembly means including an actuator means projecting through said standard frontwall and said splatter shield for engagement with the rim of a container, said standard frontwall and splatter shield being provided with elongated slots to receive said actuator means.

6. The drink mixer of claim 5 wherein said switch assembly means includes a bracket mounted upon said standard, a flat slide plate mounted for sliding movement on said bracket, one terminal end surface of said slide plate operating as a switch control surface, said slide plate being movable form a rest position to an activate position by said actuator means, switch means mounted upon said bracket and having a switch operator means adapted to contact said slide plate switch control surface when said slide plate is in the rest position, said slide plate moving out of contact with said switch operator means when said slide plate moves toward the activate position.

7. The drink mixer of claim 6 wherein said switch means includes a normally closed microswitch having a switch button which opens said microswitch when depressed, said switch operator means operating to depress said switch button when in contact with said slide plate switch control surface and to release said switch button when said slide plate moves out of contact with said switch operator means.

8. The drink mixer of claim 7 wherein biasing means is connected between said slide plate and said bracket to positively bias said slide plate toward the rest position.

9. A drink mixer comprising an upright standard having a frontwall and spaced sidewalls, a base provided at the lowermost end of said standard, a motor housing containing a motor mounted upon said standard, a stirring shaft depending from said motor housing in spaced relationship to the standard frontwall and terminating above said base, and a splatter shield of unitary construction covering said standard frontwall and curving above said base to cover said base, said splatter shield being removably mounted upon said mixer and extending between said standard frontwall and base and said stirring shaft.

10. The drink mixer of claim 9 which includes a support assembly for the bottom of a container, mounting means for removably mounting said support assembly on said standard frontwall, said splatter shield including a mounting aperture to receive said mounting means, the mounting means operating to removably secure both said support assembly and said splatter shield to the standard frontwall.

11. The drink mixer of claim 10 which includes switch assembly means mounted within said standard for controlling said motor, said switch assembly means including an actuator means projecting through said standard frontwall and said splatter shield for engagement with the rim of a container, said standard frontwall and splatter shield being provided with substantially aligned elongated slots to receive said actuator means.

12. The drink mixer of claim 11 wherein said actuator means includes a container rim receiving unit removably secured thereto between said splatter shield and said stirring shaft, said container rim receiving unit overlying said splatter shield.

* * * * *